(12) United States Patent
Kalderen et al.

(10) Patent No.: US 9,408,219 B2
(45) Date of Patent: Aug. 2, 2016

(54) DEVICE CENTRIC DISTRIBUTED RE-ENABLING OF BACKGROUND APPLICATION DATA COMMUNICATION

(71) Applicant: Verizon Patent and Licensing Inc., Arlington, VA (US)

(72) Inventors: Bjorn Olof Erland Kalderen, South Orange, NJ (US); Daniel Mindler, Somerset, NJ (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 71 days.

(21) Appl. No.: 14/556,907

(22) Filed: Dec. 1, 2014

(65) Prior Publication Data

US 2016/0157239 A1   Jun. 2, 2016

(51) Int. Cl.
  *H04W 28/02* (2009.01)
  *H04W 72/04* (2009.01)
  *H04W 76/02* (2009.01)
  *H04W 40/24* (2009.01)
  *H04W 28/10* (2009.01)

(52) U.S. Cl.
  CPC ...... *H04W 72/0486* (2013.01); *H04W 28/0289* (2013.01); *H04W 40/248* (2013.01); *H04W 76/028* (2013.01); *H04W 28/10* (2013.01)

(58) Field of Classification Search
  None
  See application file for complete search history.

(56) References Cited

U.S. PATENT DOCUMENTS

| 2012/0278464 | A1* | 11/2012 | Lehane | H04L 12/1407 709/223 |
| 2013/0301547 | A1* | 11/2013 | Gupta | H04W 76/048 370/329 |
| 2013/0324168 | A1* | 12/2013 | Ishii | H04W 48/08 455/458 |
| 2014/0019638 | A1* | 1/2014 | Kurabayashi | G06F 9/5072 709/235 |
| 2014/0347983 | A1* | 11/2014 | Griot | H04W 28/0289 370/230 |

* cited by examiner

*Primary Examiner* — Candal Elpenord (57) ABSTRACT

To reduce the potential for renewed network congestion after a need for a restriction of data communications for background applications has been eliminated, the examples implement techniques in which a mobile device calculates a distributed deactivation delay value corresponding to an amount of time to wait before deactivating the restriction. The mobile device may generate a seed value unique to the mobile device for use in generating an initial distributed deactivation delay value and random control values generated by a threshold determination. The threshold determination iterates through generating a respective control value and calculating a respective threshold value until either a relationship between the respective control value and the respective threshold value meets a threshold condition or a maximum number of iterations are performed. Each threshold determination iteration increases the initial distributed deactivation delay value such that the distributed deactivation delay value is relative to a total of performed iterations.

22 Claims, 8 Drawing Sheets

DEVICE CENTRIC DISTRIBUTED RE-ENABLING OF BACKGROUND APPLICATION DATA COMMUNICATION

BACKGROUND

In recent years, smartphones have become very popular. Communications via a network may be responsive to a user's current operation of the mobile device. However, many smartphone applications run in the background and generate data communications while the user operates the device for other purposes or is not actively using the device at all.

Smartphone users, however, may experience slow service and/or dropped calls when wireless network congestion exists. Wireless network congestion may occur when unanticipated high concentration of smartphone users in the same proximity leads to multiple applications of multiple smartphones attempting to establish data communications, even without user intervention. Typically, wireless network congestion is determined by the wireless network; and attempts to relieve the wireless network congestion involve the wireless network rejecting successive requests to establish data communications or calls. This response by the wireless network generates additional load on the wireless network and may, at least initially, exacerbate the wireless network congestion.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION OF EXAMPLES

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Heavy usage of mobile network resources causes congestion that can result in slow service and/or dropped calls. Many applications on smartphones run in the background, even when users are not actively operating the mobile devices; and many of the background activities involve data communications. For example, many applications periodically check with a server to obtain notifications that the application will offer to the user, e.g. as news updates. As another example, applications periodically check with a server for software updates. When the device is actively operated by the user, these background application data communication functions often consume a minority of network resources. However, under some circumstances, they may still exacerbate network congestion. For example, when a large crowd with smartphones are gathered in a relatively small geographic area, e.g. in a sports venue, the large number of mobile devices requesting and/or receiving background application data communications through one or a small number of network nodes may cause significant loading on the affected network resources. Users actively seeking service, e.g. to make voice calls or obtain specifically requested information, may experience service delays or even dropped calls. In order to accommodate these (very limited) times of peak demand, the network operator may need to deploy additional stationary resources (e.g., towers or base stations) that remain unused at other periods of time (which may typically represent as much as 95% of the time) and are thus essentially wasted.

To reduce the contribution of data communications for background applications to network congestion, congestion detection may lead a mobile device to impose restriction of data communications by applications running in the background. Such background application data communication restriction prevents, for example, the applications from using data communications services of the network for background data communication operations. Once network congestion has been reduced, the imposed restriction of data communications by applications running in the background may be removed. Such removal of the imposed restriction permits, for example, the applications to resume usage of data communications services of the network for background data communications operations. However, if the imposed restriction is removed from a relatively large number of mobile devices located in the same area (e.g., mobile devices in a common venue) at the same or relatively short period of time, many of those devices will have held functions requiring data communications (e.g., delayed sending pull data requests); and those devices will all try to communicate at about the same time right after the restriction is lifted. The sudden significant increase in new requests may re-introduce network congestion.

In general, a need exists for a mobile device, such as a smartphone, that may determine when wireless network congestion no longer exists (either based on notification from a wireless network or as a result of monitoring and analysis by the device) and automatically, without any additional context regarding other users or the network and independently of any other device, re-enable requests by the mobile device to establish data communications, for example, in a manner that may limit any additional network congestion due to the additional requests.

As such, the examples described below implement techniques that allow each mobile device, in a staggered or otherwise randomly delayed fashion in relation to other mobile devices in the area, to re-enable all or some portion of data communications by applications running in the background so as to limit the potential for network congestion.

The mobile device may detect congestion and/or the need to restrict background application data communications in response to a message or instruction received from a node of the network; or the mobile device may itself detect congestion from monitoring and analysis of device/network interaction behavior and trends.

Upon detection of congestion (either based on a received notification or from device monitoring and analysis), the mobile device turns on a background application data communication restriction. In the example, the background restriction applies to all applications currently running in the background and prevents those applications from using data communications services of the network for background data communication operations. For example, with the restriction on, applications running in the background without direct user interaction are blocked from sending requests for data communication to/through the network. However, even with the restriction active, the mobile device can still provide the user with the capability to interact with and use the device if desired, e.g. by operating the device to make a voice call or by activating an application so as to make a call or request a specific data service (thereby changing the status of the application from background to foreground and thus no longer subject to the restriction). For example, a device in a pocket will not originate a data connection for a background function (unless inadvertently activated), but a device with direct user interaction will originate a data connection for an active operation.

In an alternate example, the background restriction applies variably to different types of background applications. For example, one type of background application maintains a persistent connection and regularly communicates via the persistent connection. Another type of background application does not maintain a persistent connection and only awaits irregular communications. In this alternate example, various levels of network congestion are detected and the background restriction restricts the different types of background applications based on the different levels of network congestion. Different levels of network congestion are, for example, low, moderate, and high. Slight delays in traffic may be symptomatic of low congestion, severe delays in traffic may be symptomatic of moderate congestion, and data connection failures may be symptomatic of high congestion. In low and moderate congestion, for example, the background restriction only restricts communications from the type of background application with a persistent connection. In a time of high congestion, the background restriction restricts both types of background applications.

The mobile device may subsequently detect a lack of congestion and/or the ability to re-enable background application data communications in response to a message or instruction received from the node of the network; or the mobile device may itself detect the lack of congestion from monitoring and analysis of device/network interaction behavior and trends.

Upon detection of the lack of congestion (either based on a received notification or from device monitoring and analysis), each mobile device calculates a distributed deactivation delay value or an amount of time to wait before deactivating the background restriction. The distributed deactivation delay value is uniquely related to the respective mobile device such that the mobile device re-enables background application data communication at a point in time in common with at most only a portion of all those mobile devices that will be deactivating the background restriction. After waiting the calculated amount of time, the mobile device then deactivates the background restriction, permitting the background applications to use data communications services of the network for background data communication operations. Each device, however, performs its own delay calculation. A large group of such devices will calculate individual delays so as to distribute the restriction end times. In this way, control of when each device deactivates the background restriction is performed by each device, without any additional context regarding other users or the network and independently of any other device, so as to distribute the re-enabling of background application data communication for a collection of devices over time so that new congestion is not re-introduced.

In the alternate example where the background restriction applies variably to different types of background applications or a further example where reactivation of different types of background applications is to be prioritized, the calculated distributed deactivation delay value can serve, for example, as an initial delay. In these examples, after the initial delay transpires, reactivation of high priority background applications or background applications with limited communications requirements may be allowed and, after one or more subsequent delays transpire, reactivation of lower priority background applications or background applications with additional communications requirements may then subsequently be allowed.

Reference now is made in detail to the examples illustrated in the accompanying drawings and discussed below.

Figure 1:
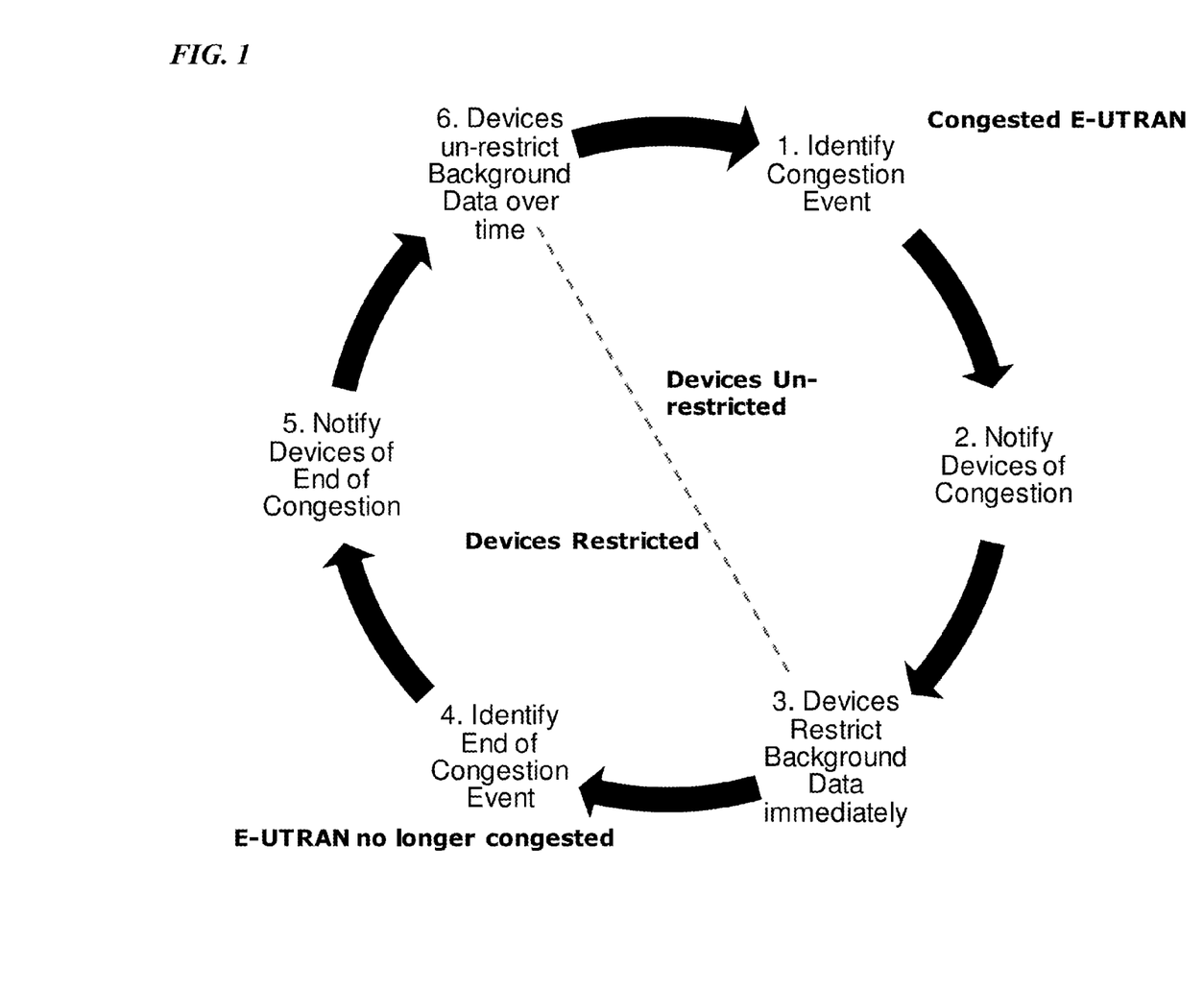
FIG. 1 is a high-level life-cycle diagram of an example of operations of mobile devices and a mobile communication network, during a period of congestion followed by a period of no congestion.

FIG. 1 depicts a life-cycle for background application data communication operations of mobile devices and a mobile communication network during a period of congestion followed by a period of no congestion. In an initial example, mobile devices are able to utilize background application data communication without any restrictions related to congestion within the mobile communication network. At 1, a congestion event is identified. For example, a relatively large number of mobile devices located in the same area (e.g., mobile devices in a common venue) attempt to utilize wireless services provided by one or a small number of network nodes of a mobile communication network at the same time or during a relatively short period of time. In this example, congestion is detected in the network; although in an alternative approach, the mobile devices may detect the congestion (e.g. based on monitoring and analysis of device/network interaction behavior and trends). Hence, in the example, at 2, mobile devices are notified of the congestion. In one example, a congestion flag is enabled within a control message delivered from the mobile communication network to the mobile devices. In a further example, the control message is a system information broadcast 2 (SIB2) message. The SIB2 message is, for example, a control message used by a base station to provide operational information to a mobile device. The control message with an enabled congestion flag serves, for example, as an instruction to the mobile device to activate a background application data communication restriction. At 3, mobile devices activate the background application data communication restriction in response to the congestion notification. With the background application data communication restriction activated, for example, the relatively large number of mobile devices located in the same area are each unable to utilize background application data communication. As a result of the background application data communication restriction (and/or for other reasons), congestion later ends; and, at 4, the end of congestion is identified. In turn, at 5, mobile devices are notified of the end of congestion. In one example, a congestion flag is disabled within a control message delivered from the mobile communication network to the mobile devices. The later control message with a disabled congestion flag serves, for example, as an instruction to the mobile device to deactivate the background application data communication restriction.

At 6, each individual device independently calculates an amount of time to wait and deactivates the background application data communication restriction after waiting the calculated amount of time. As described in greater detail below, each device calculates a wait time based on a random number unique to the respective device. For example, each device calculates its respective wait time by performing one or more iterations of a process. In each iteration, for example, the individual device generates a random reference value and calculates a threshold value. If the generated random reference value and the calculated threshold value do not meet a condition, another iteration is performed. Otherwise, if the generated random reference value and the calculated threshold value do meet the condition, the wait time is calculated based on the total number of iterations required to meet the condition. In this way, devices deactivate the background restriction in a distributed manner such that not all of the devices re-enable background application data communication at the same time, thus avoiding additional congestion.

Figure 2:
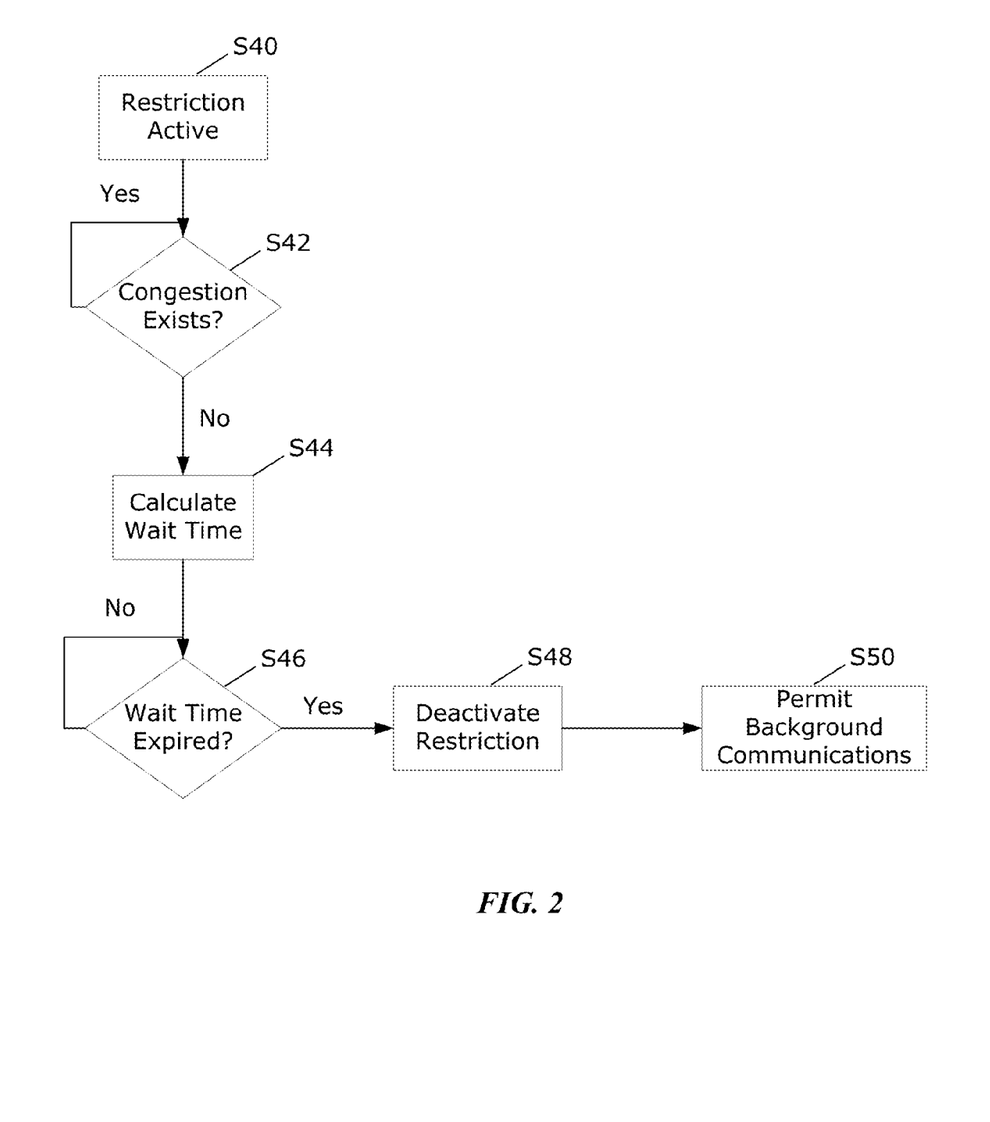
FIG. 2 is a process diagram depicting an example of a process of deactivating a background restriction after a determination that congestion no longer exists and a calculated wait time has expired.

FIG. 2 depicts a process of deactivating a background restriction after a determination that congestion no longer exists and a calculated wait time has expired. In step S40, the process begins with a background application data communication restriction active. With such restriction active, applications and/or other processes operating in the background of a mobile device are prevented from using data communications services of the network for background data communication operations. Such impacted applications and/or other processes will, for example, each address the inability to communicate differently (e.g., provide an error message to a user, wait "silently", cease operations, etc.). Functions, such as sending request messages, that are delayed during a period of restriction may be queued for execution upon termination of the restriction.

In step S42, the mobile device determines whether congestion continues to exist. In one example, the mobile device receives an indication from the mobile communication network of whether or not congestion exists. Alternatively, or in addition, the mobile device determines whether or not congestion exists, for example, based on monitoring and analysis of device/network interaction behavior and trends. If congestion continues, the process returns to step S42. If congestion does not exist, the process continues to step S44. The mobile device, in step S44, calculates an amount of time unique to the mobile device to wait before re-enabling background application data communication, as described in greater detail below.

At step S46, the mobile device determines whether the calculated wait time has expired. If, in one example, the wait time has not expired, the process returns to step S46. Otherwise, in a further example, the process continues to step S48 when the wait time has expired. The mobile device, in step S48, deactivates the background application data communication restriction. With such restriction deactivated, applications and/or other processes operating in the background of the mobile device resume use of data communications services of the network for background data communication operations. In step S50, the mobile device permits background application data communication.

Figure 3:
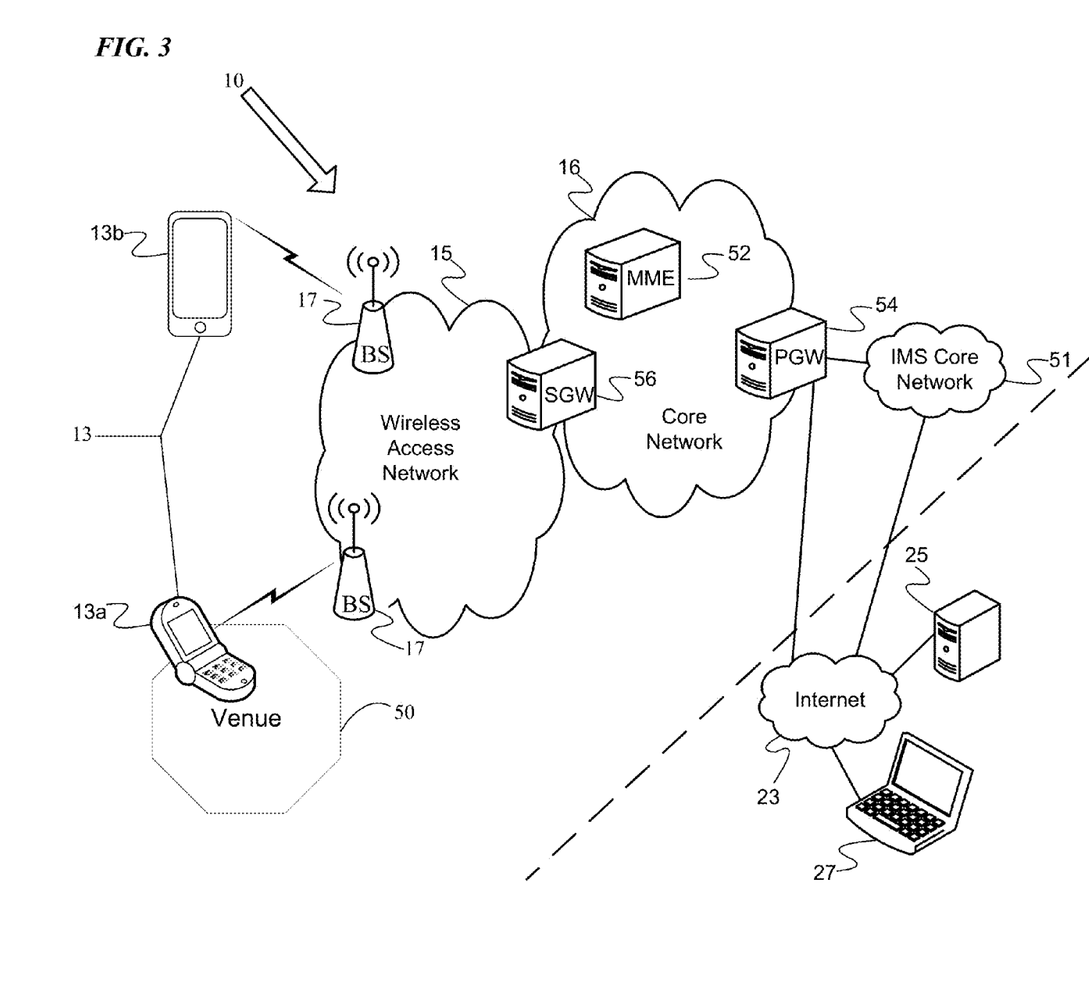
FIG. 3 is a high-level functional block diagram of an example of a system of networks/devices that provide various communications for mobile devices and support an example of a background application data communication restriction service and device centric distributed re-enabling of background application data communication.

FIG. 3 illustrates a system 10 offering a variety of mobile communication services, including communications for wireless data by mobile devices 13 of various users. The example shows simply two mobile devices 13a and 13b as well as a mobile communication network 10. The devices 13a and 13b are examples of mobile devices that may be used for background application data communication restriction and device centric distributed re-enabling of background application data communication. However, the network will provide similar communications for many other similar users as well as for mobile devices/users that do not participate in background application data communication restriction and re-enabling background application data communication. The network 10 provides mobile wireless communications services to those devices as well as to other mobile devices (not shown), for example, via a number of base stations (BSs) 17. In a 4G LTE network implementation, for example, the base stations are implemented by equipment identified as eNodeBs. The present techniques may be implemented in any of a variety of available mobile networks 10 and/or on any type of mobile device compatible with such a network 10, and the drawing shows only a very simplified example of a few relevant elements of the network 10 for purposes of discussion here.

The wireless mobile communication network 10 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard, a 4G long term evolution (LTE) standard or other standards used for public mobile wireless communications. Although various network architectures may be used to form the network, the drawing shows an arrangement using one or more wireless access networks 15 and a core network 16, operated by one mobile carrier. Hence, the illustrated system example includes a mobile communication network 10, in this case, operated in accordance with 4G LTE standards. Mobile network 10 may provide mobile telephone communications as well as Internet data communication services. For example, mobile network 10 may connect to the public switched telephone network (PSTN, not shown) and public packet-switched data communication networks such as the Internet 23 via packet data gateway (PGW) 54. Data communications via mobile network 10 provided for users of mobile devices 13 may support a variety of services such as communications of text and multimedia messages, e-mail, web browsing, streaming or downloading content, etc. with network connected equipment such as a server 25 and/or laptop computer 27 in the drawing. Voice communication also may involve transport via the Internet 23 using voice over Internet Protocol (VoIP) technologies.

The mobile communication network 10 may further provide communication services to mobile devices 13 that are located within a venue 50. In the example of FIG. 3, mobile device 13a is located within venue 50 and mobile device 13b is not located within venue 50 although at other times they may both be in the venue 50 (with other mobile devices). This, however, is only for simplicity. Venue 50 may be, for example, a sports arena or stadium. Venue 50 may, for example, have capacity for a large number of users of mobile devices 13. Such large number of mobile devices 13 within close geographical proximity served by a common one or more of the base stations 17 might exceed the planned capacity of the serving base station(s) and may cause congestion on at least a portion of the mobile communication network 15. The congestion on the mobile communication network 15 caused by the large number of mobile devices 13 may result in slow service and/or dropped calls for those devices at the venue 50 and possibly in some surrounding areas.

The illustrated system 10 can be implemented by a number of interconnected networks. Hence, the overall network 10 may include a number of wireless access networks 15, as well as regional ground networks interconnecting a number of wireless access networks and a wide area network (WAN) interconnecting the regional ground networks to core network elements. A regional portion of the network 10, such as that serving mobile devices 13, can include one or more wireless access networks 15 and a regional packet switched network and associated signaling network facilities. The mobile devices 13 may be capable of voice telephone communications through the network 10; and, for background application data communication restriction and device centric distributed re-enabling of background application data communication, the examples of devices shown at 13a and 13b are capable of data communications through the particular type of network 10 (and the users thereof typically will have subscribed to data service through the network).

Physical elements of a 4G LTE wireless access network 15 include a number of nodes referred to as eNodeBs represented in the example by eNodeBs 17. Although not separately shown, such an eNodeB can include a base transceiver system (BTS), which can communicate via an antennae system at the site of eNodeB and over the airlink with one or more mobile devices 13, when any mobile device is within range. Each eNodeB can include a BTS coupled to several antennae mounted on a radio tower within a coverage area often referred to as a "cell." The BTS is the part of the radio network that sends and receives RF signals to/from the mobile device 13 that is served by eNodeB 17. Such eNodeBs 17 operate in accordance with the more modern LTE network standard, sometimes referred to as 4G and/or 4G LTE. Packet routing and control functions may be implemented in packet routers and/or associated server platforms in the wireless access network or in many cases in elements of an IP Multimedia Service (IMS) core network 51 coupled to some number of 4G wireless access networks 15 via core network 16, although such routing and control element(s) are generically included in the broad class of devices that may be used to implement the network functionality discussed here.

The wireless access network 15 interconnects with the core traffic network represented generally by the cloud at 16 via a serving packet gateway (SGW) 56, which carries the user communications and data for the mobile device 13 between an eNodeB 17 and other elements with or through which the mobile devices communicate. The networks can also include other elements that support functionality such as messaging service messages and voice communications. Specific elements of the network 16 for carrying the voice and data traffic and for controlling various aspects of the calls or sessions through the network 16 are omitted here for simplicity. It will be understood that the various network elements can communicate with each other and other aspects of the illustrated system 10 and other networks (e.g., the PSTN (not shown) and the Internet 23) either directly or indirectly.

Mobile devices 13 can take the form of portable handsets, smart-phones or personal digital assistants, although they may be implemented in other form factors. Program applications, including an application to assist in background application data communication restriction and device centric distributed re-enabling of background application data communication and/or any application purchased via an online service can be configured to execute on many different types of mobile devices 13. For example, a mobile device application can be written to execute on a binary runtime environment for mobile (BREW-based) mobile device, a Windows Mobile based mobile device, Android, iOS for iPhone or iPad, Java Mobile, or RIM based mobile device such as a BlackBerry or the like. Some of these types of devices can employ a multi-tasking operating system.

A mobile device 13 communicates over the air with an eNodeB 17 and through the traffic network 16 for various voice and data communications, e.g. through the Internet 23 with a server such as the application server 25. Such communication may be in response to a user interacting with an application, e.g. a web browser. Alternatively, the communication may be in response to an application operating without current user interaction, e.g. a social networking application requesting or receiving a status update. While an application is operating without current user interaction, the application may be referred to, for example, as a background application; and the corresponding communication is referred to, for example, as background application data communication. Servers such as 25 may provide any of a variety of common application or service functions in response to data communication (e.g., background application data communication) originating from an application program (e.g., background application) running on the mobile device 13. For a given service, including background application data communication restriction and device centric distributed re-enabling of background application data communication, an application program within the mobile device may be considered as a 'client' and the programming at 25 may be considered as the 'server' application for the particular service.

Mobile network 16 includes one or more mobility management entities (MMEs) 52 with which the PGW 54 interacts to establish communications between mobile device 13 and eNodeB 17. In the core traffic network 16, the MME 52 provides control and management functionality while SGW 56 performs data routing between mobile device 13 and PGW 54 (e.g., call data during a VoLTE call).

If the mobile service carrier utilizes background application data service restriction and offers device centric distributed re-enabling of background application data service based on wireless communication congestion identification, as described in greater detail below, such congestion identification may be performed by a wireless communication congestion detector (not shown) within and/or coupled to eNodeB 17. Alternatively, or in addition, such wireless communication congestion detector is, for example, within and/or coupled to MME 52. In one example, eNodeB 17 identifies wireless communication congestion and notifies mobile device 13 of such congestion. Such notification of congestion, in this example, serves as an instruction to mobile device 13 to activate a background application data communication restriction. In an additional example, eNodeB 17 identifies a reduction in or elimination of wireless communication congestion and notifies mobile device 13 of such end of congestion. Such notification of the end of congestion, in this additional example, serves as an instruction to mobile device 13 to deactivate the background application data communication restriction. When there is wireless communication congestion, functions of applications running only in the background of mobile device 13 can be restricted. Even with such a restriction active, functions that are actively supporting current user operation of the device (e.g. operating in the foreground) are allowed access to network communication service(s). The foreground functions, for example, may be voice calls, mobile text or multimedia messaging, and/or data functions or applications actively selected by the user.

The background application data communication restriction and device centric distributed re-enabling of background application data communication under consideration here may be delivered to touch screen type mobile devices as well as to non-touch type mobile devices. Hence, our simple example shows the mobile device 13a as a non-touch type mobile device and shows the mobile device 13b as a touch screen type mobile device. Implementation of background application data communication restriction and device centric distributed re-enabling of background application data communication will involve at least some execution of programming in the mobile devices as well as implementation of user input/output functions and data communications through the network 10, from the mobile devices. Congestion detection may be implemented in network elements, e.g. eNodeB 17, or in mobile devices 13.

It may be useful to consider the functional elements/aspects of examples of two types of mobile devices 13a and 13b, at a high-level.

Figure 4:
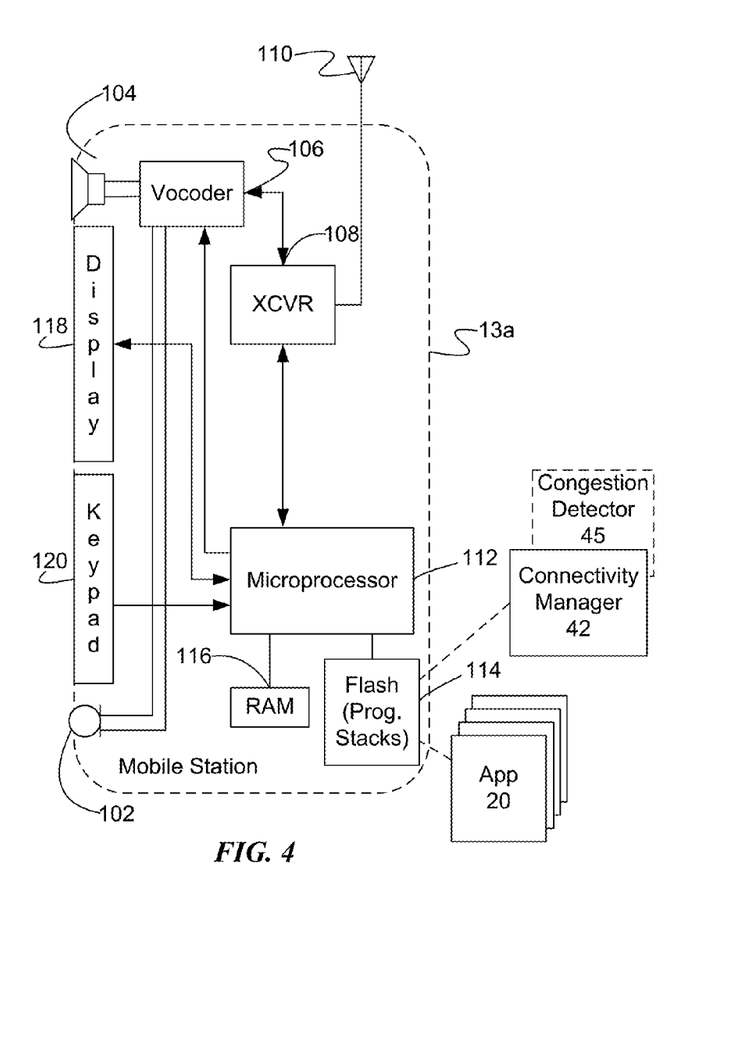
FIG. 4 is a high-level functional block diagram of a non-touch type mobile device, as an example of a device that may utilize the device centric distributed re-enabling of background application data communication after activation of a restriction through a network/system like that shown in FIG. 3.

For purposes of such discussion, FIG. 4 provides a block diagram illustration of an example of a non-touch type mobile device 13a. Although the mobile device 13a may be a smartphone or may be incorporated into another device, such as a personal digital assistant (PDA) or the like, for discussion purposes, the illustration shows the mobile device 13a is in the form of a handset. The handset embodiment of the mobile device 13a functions as a normal digital wireless telephone station. For that function, the station 13a includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications.

For digital wireless communications, including wireless data communications such as background application data communication, the handset 13a also includes at least one digital transceiver (XCVR) 108. Today, the handset 13a would be configured for digital wireless communications using one or more of the common network technology types. The concepts discussed here encompass embodiments of the mobile device 13a utilizing any digital transceivers that conform to current or future developed digital wireless communication standards. The mobile device 13a may also be capable of analog operation via a legacy network technology.

The transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile device 13a and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

The mobile device 13a includes a display 118 for displaying messages, menus or the like, call related information dialed by the user, calling party numbers, etc. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. Various combinations of the keypad 120, display 118, microphone 102 and speaker 104 may be used as the physical input output elements of the graphical user interface (GUI), for multimedia (e.g., audio and/or video) communications. Of course other user interface elements may be used, such as a trackball, as in some types of PDAs or smart phones.

A microprocessor 112 serves as a programmable controller for the mobile device 13a, in that it controls all operations of the mobile device 13a in accord with programming that it executes, for all normal operations, and for operations involved in background application data communication restriction and device centric distributed re-enabling of background application data communication procedures under consideration here. In the example, the mobile device 13a includes flash type program memory 114, for storage of various "software" or "firmware" program routines and mobile configuration settings, such as mobile directory number (MDN) and/or mobile identification number (MIN), etc. The mobile device 13a may also include a non-volatile random access memory (RAM) 116 for a working data processing memory. Of course, other storage devices or configurations may be added to or substituted for those in the example. In a present implementation, the flash type program memory 114 stores firmware such as a boot routine, device driver software, an operating system, call processing software, a connectivity manager 42, a congestion detector 45, and vocoder control software, and any of a wide variety of other applications 20, such as client browser software and short message service software, any of which may operate with active user intervention or in the background without user intervention. The memories 114, 116 also store various data, such as telephone numbers and server addresses, downloaded data such as multimedia content, and various data input by the user. Programming stored in the flash type program memory 114, sometimes referred to as "firmware," is loaded into and executed by the hardware circuitry of the microprocessor 112.

Some of applications 20 may, for example, generate data communication over the mobile network 15 without interaction with a user of mobile device 13a under control of connectivity manager 42. In one example, congestion detector 45 identifies wireless communication congestion and notifies connectivity manager 42 of such congestion. Alternatively, or in addition, such wireless communication congestion is identified by one or more elements of mobile network 10 (e.g., eNodeB 17, MME 52) which in turn notifies connectivity manager 42 of such congestion. Based on a received notification of congestion, connectivity manager 42 activates, in the example, a background application data communication restriction. Furthermore, based on a received notification of an end of congestion, either from congestion detector 45 or mobile network 10, connectivity manager 42 deactivates the background application data communication restriction, as described in greater detail below.

As outlined above, the mobile device 13*a* includes a processor, and programming stored in the flash memory 114 configures the processor so that the mobile device is capable of performing various desired functions, including in this case the functions involved in the techniques for providing background application data communication restriction and device centric distributed re-enabling of background application data communication.

Figure 5:
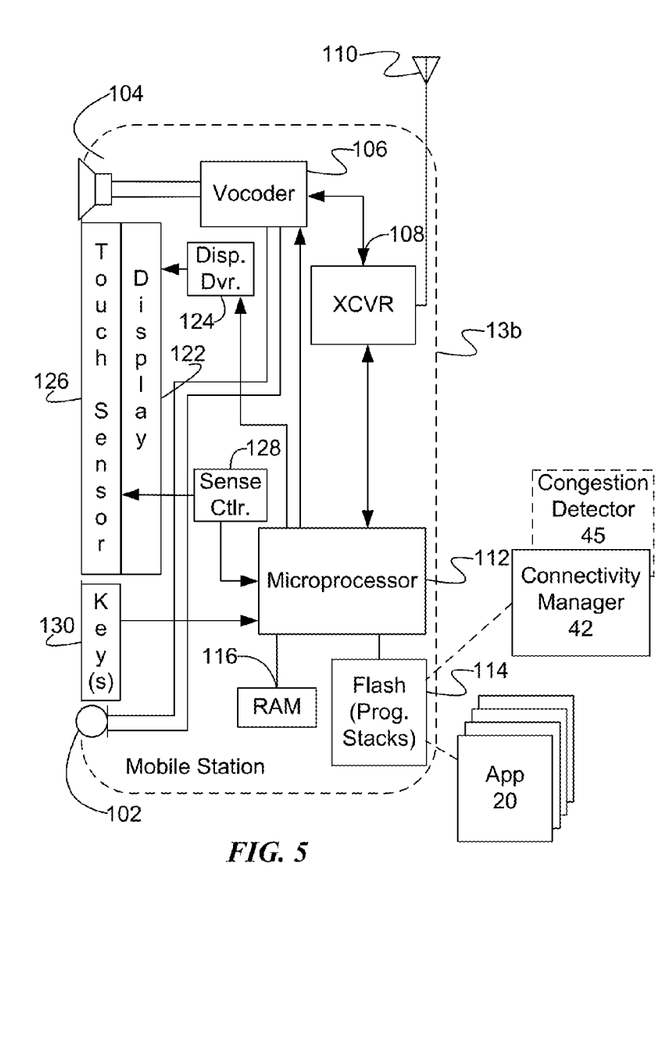
FIG. 5 shows, in high-level functional block diagram form, a touch screen type mobile device, as another example of a device that may utilize the device centric distributed re-enabling of background application data communication after activation of a restriction through a network/system like that shown in FIG. 3.

For purposes of such a discussion, FIG. 5 provides a block diagram illustration of an example of a touch screen type mobile device 13*b*. Although possibly configured somewhat differently, at least logically, a number of the elements of the touch screen type mobile device 13*b* are similar to the elements of mobile device 13*a*, and are identified by like reference numbers in FIG. 5. For example, the touch screen type mobile device 13*b* includes a microphone 102, speaker 104 and vocoder 106, for audio input and output functions, much like in the earlier example. The mobile device 13*b* also includes at least one digital transceiver (XCVR) 108, for digital wireless communications, although the handset 13*b* may include an additional digital or analog transceiver. The concepts discussed here encompass embodiments of the mobile device 13*b* utilizing any digital transceivers that conform to current or future developed digital wireless communication standards. As in the mobile device 13*a*, the transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile device 13*b* and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

As in the example of mobile device 13*a*, a microprocessor 112 serves as a programmable controller for the mobile device 13*b*, in that it controls all operations of the mobile device 13*b* in accord with programming that it executes, for all normal operations, and for operations involved in background application data communication restriction and device centric distributed re-enabling of background application data communication procedures under consideration here. In the example, the mobile device 13*b* includes flash type program memory 114, for storage of various program routines and mobile configuration settings. The mobile device 13*b* may also include a non-volatile random access memory (RAM) 116 for a working data processing memory. Of course, other storage devices or configurations may be added to or substituted for those in the example. Similar to the implementation of mobile device 13*a*, the flash type program memory 114 stores firmware such as a boot routine, device driver software, an operating system, call processing software, a connectivity manager 42, a congestion detector 45, and vocoder control software, and any of a wide variety of other applications 20, such as client browser software and short message service software, any of which may operate with active user intervention or in the background without user intervention.

Some of applications 20 may, for example, generate data communication over the mobile network 15 without interaction with a user of mobile device 13*b* under control of connectivity manager 42. In one example, congestion detector 45 identifies wireless communication congestion and notifies connectivity manager 42 of such congestion. Alternatively, or in addition, such wireless communication congestion is identified by one or more elements of mobile network 10 (e.g., eNodeB 17, MME 52) which in turn notifies connectivity manager 42 of such congestion. Based on a received notification of congestion, connectivity manager 42 activates, in the example, a background application data communication restriction. Furthermore, based on a received notification of an end of congestion, either from congestion detector 45 or mobile network 10, connectivity manager 42 deactivates the background application data communication restriction, as described in greater detail below.

Hence, outlined above, the mobile device 13*b* includes a processor, and programming stored in the flash memory 114 configures the processor so that the mobile device is capable of performing various desired functions, including in this case the functions involved in the techniques for providing background application data communication restriction and device centric distributed re-enabling of background application data communication.

In the example of FIG. 5, the user interface elements included a display and a keypad. The mobile device 13*b* may have a limited number of key(s) 130, but the user interface functions of the display and keypad are replaced by a touchscreen display arrangement. At a high level, a touchscreen display is a device that displays information to a user and can detect occurrence and location of a touch on the area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display.

Hence, the mobile device 13*b* in our example includes a display 122, which the microprocessor 112 controls via a display driver 124, to present visible outputs to the device user. The mobile device 13*b* also includes a touch/position sensor 126. The sensor 126 is relatively transparent, so that the user may view the information presented on the display 122. A sense circuit 128 sensing signals from elements of the touch/position sensor 126 and detects occurrence and position of each touch of the screen formed by the display 122 and sensor 126. The sense circuit 128 provides touch position information to the microprocessor 112, which can correlate that information to the information currently displayed via the display 122, to determine the nature of user input via the screen.

The display 122 and touch sensor 126 (and possibly one or more keys 130, if included) are the physical elements providing the textual and graphical user interface for the mobile device 13*b*. The microphone 102 and speaker 104 may be used as additional user interface elements, for audio input and output.

The structure and operation of the mobile devices 13*a* and 13*b*, as outlined above, were described to by way of example, only.

Figure 6:
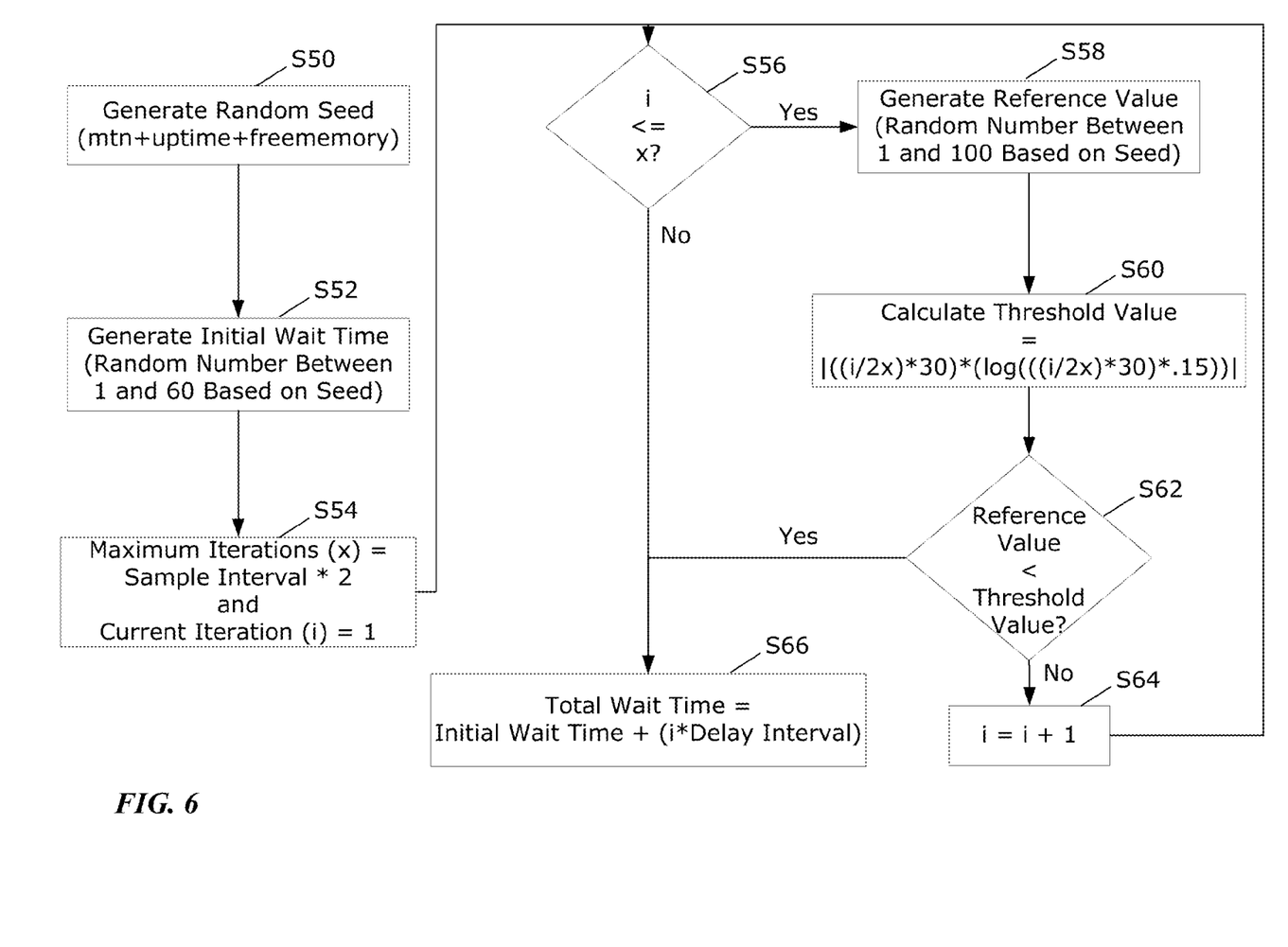
FIG. 6 is a process diagram depicting an example of the processes performed by a mobile device to calculate a wait time for use in device centric distributed re-enabling of background application data communication.

FIG. 6 depicts a process, by way of example, that may be performed by mobile devices 13 as part of device centric distributed re-enabling of background application data communication. In particular, FIG. 6 depicts an example of a process for calculating an amount of time to wait for each mobile device 13 before the mobile device 13 can re-enable background application data communication after congestion is eliminated. Each mobile device with the background application data communication restriction activated will perform a similar calculation. However, the process causes different devices to calculate different delays and therefore deactivates the restriction at different times.

The process starts at step S50 by generating a seed for use in generating random numbers, as described in greater detail below. The seed is based, for example, on a unique attribute of mobile device 13 such that each mobile device 13 generates a seed unique to that mobile device. In one example, the unique attribute includes the mobile telephone number (MTN) of mobile device 13, the time in seconds since mobile device 13 was last booted (e.g., uptime) and the amount of free memory in the runtime of the mobile device 13. In a further example, the seed is generated by concatenating each of the values included in the unique attribute (e.g., MTN, uptime and runtime free memory) into a single value.

In step S52, mobile device 13 generates an initial wait time. For example, mobile device 13 generates a random number between 1 and 60 based on the seed generated in step S50. The range of 1 to 60 is, for example, based on the number of seconds in a minute. Thus, the initial wait time, in this example, is a number of seconds mobile device 13 will wait before re-enabling background application data communication. This initial wait time will be modified, for example, by one or more iterations of a total wait time calculation performed by subsequent steps of the process of FIG. 6.

In step S54, a maximum number of iterations (x) of the total wait time calculation to be performed is established and the current iteration (i) of the calculation is set to 1. In one example, the maximum number of iterations (x) is set to 2 times a sample interval. For example, if sampling to determine whether or not congestion exists is performed every 15 minutes, then the sample interval is 15 and the maximum number of iterations (x) is 30 (e.g., 2*15=30). Although the example utilizes 2 as the multiplier, no such requirement exists and any number of intervals may be utilized. However, since the maximum number of iterations also corresponds to the range of time during which devices will re-enable background application data communication, any larger multiplier represents an increased amount of time before a last mobile device will re-enable background application data communication.

Each iteration of the total wait time calculation begins in step S56 by determining, for example, whether the maximum number of iterations has been performed (e.g., i≤x). If, for example, the current iteration (i) is greater than the maximum number of iterations (x), the process proceeds to step S66, described below, where a total wait time is calculated. Thus, even if a desired condition (e.g., a generated reference value is less than a threshold value) is not met while performing multiple iterations of the process, as described below in steps S58-S64, the process will ultimately result in a total wait time that is within an acceptable amount of time. Otherwise, the process proceeds to step S58.

In step S58, a reference value is generated, for example, by generating a random number between 1 and 100 based on the seed generated in step S50. In step S60, a threshold value is calculated, for example, utilizing the formula $|((i/2x)*30)*(\log((((i/2x)*30)*0.15))|$ where x is the maximum number of iterations and i is the current iteration. As described further below in relation to FIG. 7, such formula generates a threshold value that, with the exception of the first few iterations, increases in value with each subsequent iteration. Although the example describes using a specific formula, no such requirement exists and any formula that generates a threshold value that, with each subsequent iteration, increases the likelihood that comparison with a generated reference value will meet a predetermined condition may be utilized.

Next, in step S62, the randomly generated reference value is compared to the calculated threshold value. If, for example, the reference value is less than the threshold value, the process proceeds to step S66, described below, where a total wait time is calculated. Otherwise, the process proceeds to step S64 where the current iteration (i) is increased by one and the process then returns to step S56 to determine whether the maximum number of iterations has been performed.

In general, each iteration of steps S58-S64 increases the total wait time by a predetermined delay value. Because each device generates a random seed unique to the respective device and each device generates a random reference value during each iteration based on the unique seed, the odds that any one mobile device will generate a random reference value and calculate a threshold value during any given iteration that meets the predetermined condition ensure that only a subset of devices, such as less than 10% of devices, are able to re-enable background application data communication during each time period while allowing all of the devices to re-enable background application data communication within an acceptable overall amount of time.

In step S66, a total wait time is calculated, for example, by adding the initial wait time (e.g., random value between 1 and 60 generated in step S52) to a delay interval multiplied by the current iteration (i). The total wait time is, for example, a distributed deactivation delay value. In one example, the delay interval is 60, representing 60 seconds or 1 minute. Thus, if the maximum number of iterations is performed and i equals 31, for example, the total wait time calculated is the initial wait time (e.g., random number between 1 and 60) plus 1,860 (e.g., i*delay interval or 31 (one more than maximum iterations)*60). In this example of maximum delay, the calculated wait time would be up to 1,920 seconds or 32 minutes if the initial random number was 60. Alternatively, if the randomly generated reference number is less than the calculated threshold value during one iteration (e.g., the $15^{th}$ iteration), the process is shortened and the total wait time is less (e.g., initial wait time (random number between 1 and 60) plus 15 (current iteration)*60 (delay interval) or a total wait time of 900 to 960 seconds).

In this way, each mobile device 13 will wait, at most, a maximum amount of time (e.g., 32 minutes) before re-enabling background application data communication while various groups of some number of mobile devices 13 will each re-enable background application data communication after only waiting some varying amount of time (e.g., the amount of time waited is distributed between mobile devices 13 during some period of time).

Figure 7:
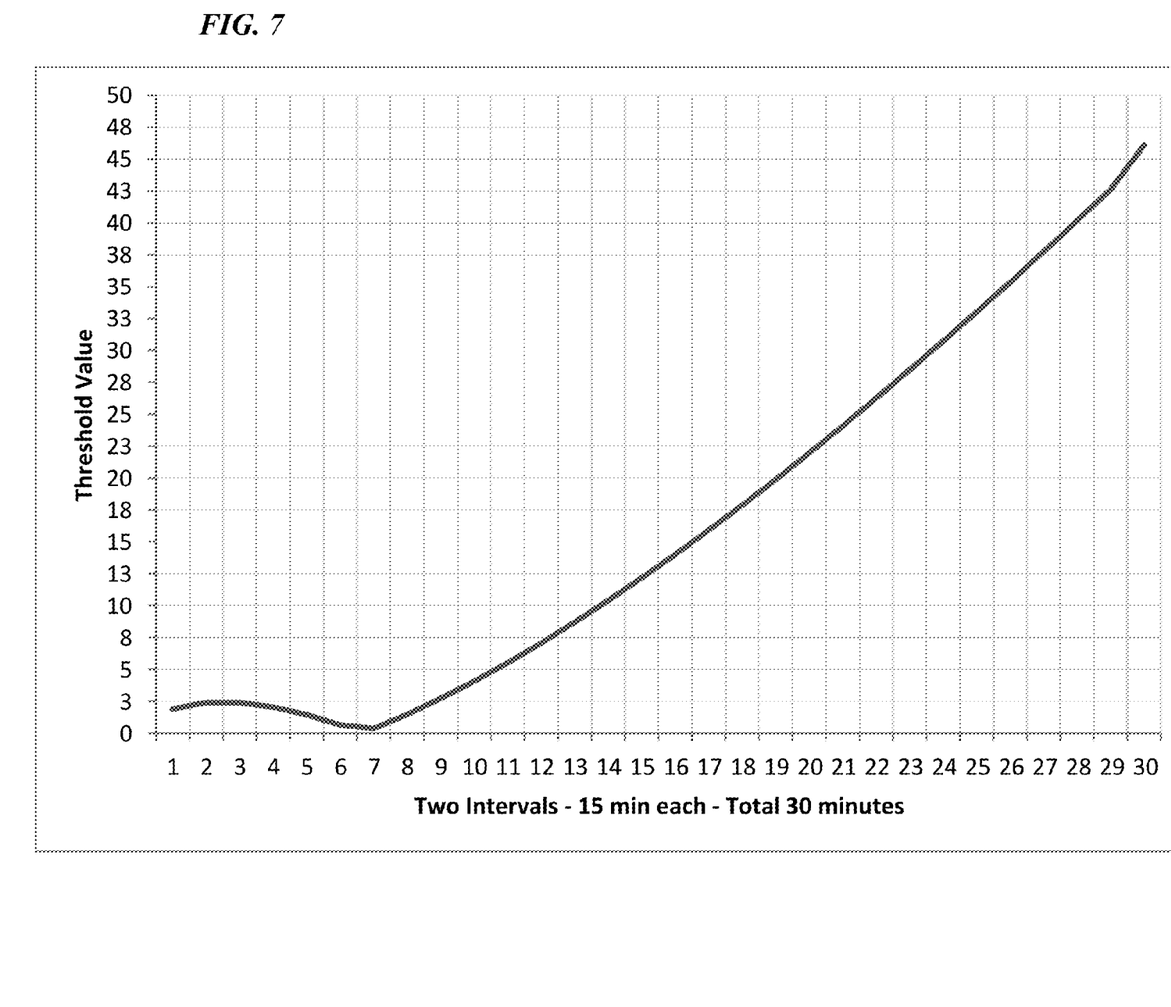
FIG. 7 is a graph depicting an example of a change in a threshold value over time during device centric distributed re-enabling of background application data communication.

FIG. 7 depicts an example of a graph of threshold values calculated during each iteration of the total wait time calculation. As can be seen, the calculated threshold value for each iteration increases with each subsequent iteration, with the exception of the first few iterations. Because each device utilizes the identical formula, all devices will generate an identical increasing threshold value during each iteration of the threshold determination. However, because each device generates a random reference value based on a random seed unique to the respective device during each iteration of the threshold determination, only some subset of devices will generate such a reference value that, when compared with the calculated threshold value, meets a predetermined condition relative to the threshold value. As such, with each subsequent iteration, the likelihood that the randomly generated reference value will be less than the calculated threshold value is increased. At the same time, the random nature of the reference value allows greater variability distributed across all of the mobile devices 13.

Figure 8:
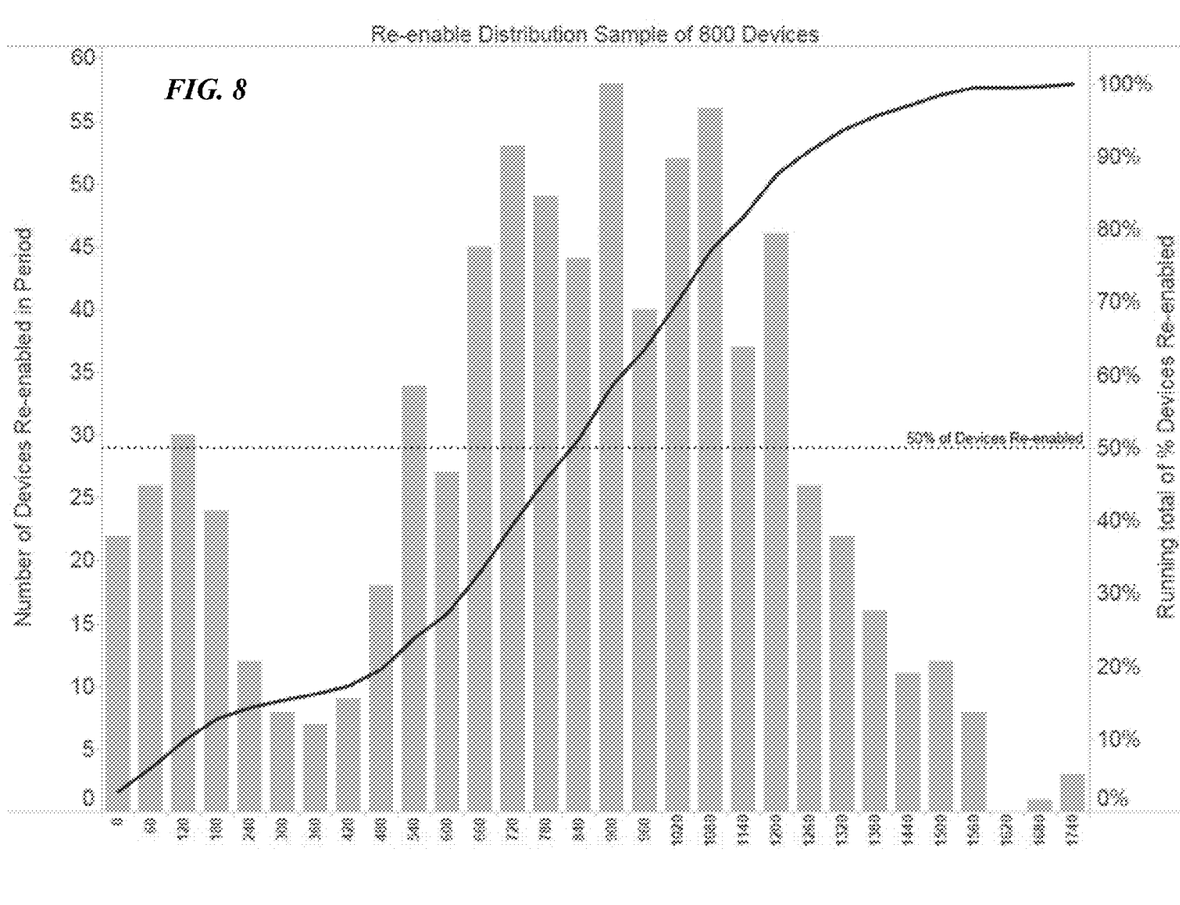
FIG. 8 is a graph depicting an example of the distribution of devices eligible to re-enable background application data communication over time during utilization of device centric distributed re-enabling of background application data communication.

FIG. 8 depicts an example of a distribution of mobile devices 13 and a corresponding time after which background application data communication was re-enabled on each mobile device 13. Specifically, the lower edge depicts each 60 second range during which a mobile device 13 may be able to re-enable background application data communication for two 15 minute intervals. The left edge depicts the total number of devices 13 that re-enabled background application data communication during each 60 second range while the right edge depicts the total percent of devices 13 for which background application data communication was re-enabled after each subsequent 60 second range. For example, within the first 60 seconds, approximately 22 mobile devices re-enabled background application data communication. Similarly, after 840 seconds, for example, approximately 50% of all of the mobile devices 13 had re-enabled background application data communication. As can be seen, while approximately 50% of all devices 13 will re-enable background application data communication within a first interval (e.g., 15 minutes), all of the mobile devices 13 will re-enable background application data communication within two intervals (e.g., 30 minutes) and the number of mobile devices 13 re-enabling background application data communication will be distributed throughout those two intervals. In this way, mobile devices 13 that activated a background application data communication restriction due to congestion can re-enable background application data communication without causing additional congestion.

Although FIGS. 6-7 and the corresponding description provides for a specific algorithm to calculate a threshold value during each iteration as well as the condition that the generated reference value is less than the calculated threshold value, no such requirement exists. Any algorithm that provides for an increasing region and a condition that places a reference value within such increasing region may, for example, meet the needs of the total wait time calculation procedure. By generating random numbers based on a seed uniquely tied to each mobile device 13 there is, during each iteration, some variability between all of the randomly generated reference values for those mobile devices 13 still calculating a total wait time. By ensuring such variability, the number of mobile devices 13 re-enabling background application data communication during each range is distributed across all of the ranges within a set number of intervals.

Figures 9, 10, 11:
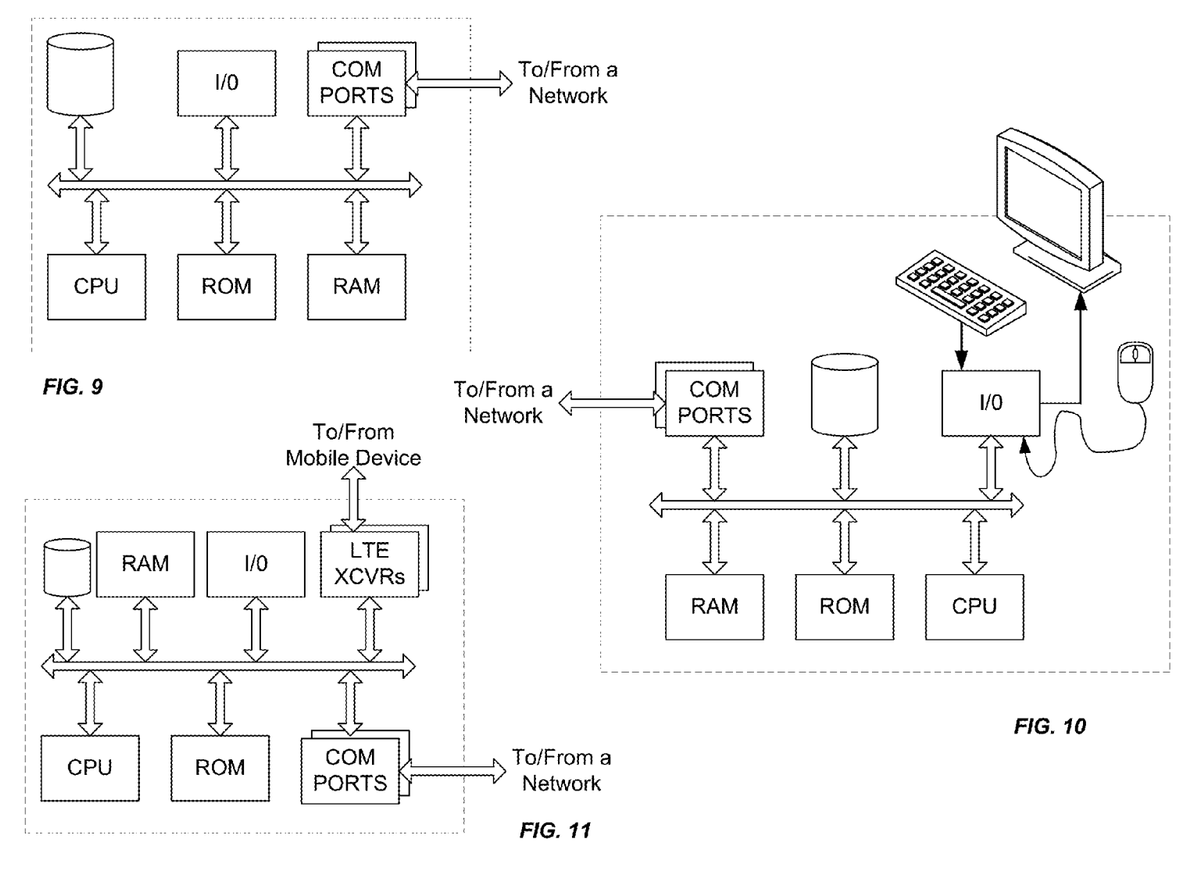
FIG. 9 is a simplified functional block diagram of a computer that may be configured as a host or server, for example, to function as the application server in the system of FIG. 3.
FIG. 10 is a simplified functional block diagram of a personal computer or other work station or terminal device.
FIG. 11 is a simplified functional block diagram of a wireless network node, such as an evolved node B found in the system of FIG. 3.

FIG. 9 provides a functional block diagram illustration of a general purpose computer hardware platform. More specifically, FIG. 9 illustrates a network or host computer platform, as may typically be used to implement a server, such as application server 25. FIG. 10 depicts a computer with user interface elements, as may be used to implement a personal computer or other type of work station or terminal device, although the computer of FIG. 10 may also act as a server if appropriately programmed. FIG. 11 depicts a system with one or more wireless transceivers, as may be used to implement a wireless network node, such as eNodeB 17 in FIG. 3. It is believed that the general structure and general operation of such equipment as shown in FIGS. 11-13 should be self-explanatory from the high-level illustrations.

A server computer, for example, includes a data communication interface for packet data communication. The server computer also includes a central processing unit (CPU), in the form of circuitry of one or more processors, for executing program instructions. The server platform typically includes an internal communication bus, program storage and data storage for various data files to be processed and/or communicated by the server, although the server computer often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface, processing circuitry forming a CPU, main memory and one or more mass storage devices for storing user data and the various executable programs (see FIG. 9). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

A wireless network node, such as an evolved node B, also includes a data communication interface, CPU, main memory and storage for data and/or programming (see FIG. 11). In addition, such wireless network node includes one or more wireless transceivers in order to provide communications services to one or more mobile devices via various radio frequencies in compliance with one or more wireless communications standards (e.g., LTE). Although FIG. 11 depicts the system enclosed within a single structure, such physical structure is not required. Alternatively, or in addition, certain components may be located, either physically or logically, within disparate elements. For example, while the wireless network node includes the data communication interface and wireless transceiver(s), processing to control such communication interfaces may be implemented by a CPU and programming stored in a memory of another device, such as MME 52.

Aspects of the background application data communication restriction service outlined above also may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the other network 39 into the computer platform of the mobile network node 41, or from a host server into a mobile device 13. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to "non-transitory", "tangible", or "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer (s) or the like, such as may be used to implement the MME 52, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A mobile device, comprising:
    a wireless transceiver configured to provide mobile communications through a network via wireless link;
    at least one user interface element configured to provide information output to a user and receive user input;
    a processor, coupled to the wireless transceiver and the at least one user interface element, configured to control operations of the mobile device;
    a memory coupled to enable the processor to access the memory;
    application programs in the memory for execution by the processor; and a connectivity manager program in the memory, wherein execution of the connectivity manager program by the processor configures the mobile device to implement functions, including functions to:
    while a background data communication restriction preventing the application programs from using data communications services of the network for background data communication operations is active in response to a previous determination that the network was subject to wireless data communication congestion, determine the network is no longer subject to the wireless data communication congestion;
    in response to the determination that the network is no longer subject to the wireless data communication congestion, calculate a distributed deactivation delay value uniquely related to the mobile device representing an amount of time the mobile device will wait before deactivating the background data communication restriction; and
    after waiting the amount of time corresponding to the distributed deactivation delay value, deactivate the background data communication restriction with respect to the application programs and permit the application programs to use data communications services of the network for background data communication operations.

2. The mobile device of claim 1, wherein the implemented function to determine the network is no longer subject to the wireless data communication congestion comprises a function to receive a notification that the network is no longer subject to the wireless data communication congestion, over the wireless link from a node of the network.

3. The mobile device of claim 2, wherein the notification that the network is no longer subject to the wireless data communication congestion is received in a control message.

4. The mobile device of claim 1, wherein the implemented function to determine the network is no longer subject to the wireless data communication congestion comprises one or more functions to monitor and analyze interaction of the mobile device with the network via the wireless link and detect a condition corresponding to a lack of wireless data congestion.

5. The mobile device of claim 1, wherein the implemented function to calculate the amount of time to wait before deactivating the background data communication restriction comprises functions, including functions to: generate an initial distributed deactivation delay value; and perform one or more iterations of a threshold determination until the first of either: a threshold condition is met; or a total number of iterations performed exceeds a maximum number of iterations to be performed, wherein each performed iteration of the threshold determination increases the initial distributed deactivation delay value such that the distributed deactivation delay value is relative to the initial distributed deactivation delay value and the total number of iterations performed.

6. The mobile device of claim 5, wherein: each iteration of the threshold determination comprises functions, including functions to: generate a respective control value; and calculate a respective threshold value; and the threshold condition is met based on a relationship between the respective control value and the respective threshold value produced in each iteration.

7. The mobile device of claim 6, wherein the implemented function to calculate the respective threshold value comprises calculating $|((i/2x)*30)*(\log(((i/2x)*30)*0.15))|$, wherein i is a number representing a current iteration of the threshold determination and x is the maximum number of iterations to be performed.

8. The mobile device of claim 7, wherein the threshold condition is met if the respective control value produced in the current iteration is less than the respective threshold value produced in the current iteration.

9. The mobile device of claim 6, wherein: further execution of the connectivity manager program by the processor further configures the mobile device to implement functions, including a function to generate a seed value unique to the mobile device, the seed value based on a mobile telephone number of the mobile device, an amount of time in seconds since the mobile device was powered on, and an amount of available free memory in a runtime of the mobile device; the implemented function to generate the initial distributed deactivation delay value comprises a function to generate a random number between 1 and 60 based on the seed value; and the implemented function to generate the respective control value comprises a function to generate a random number between 1 and 100 based on the seed value.

10. A method, comprising steps of:
  determining, by a mobile device and while a background data communication restriction of the mobile device prevents application programs on the mobile device from using data communications services of a network for background data communication operations due to a previous determination that the network was subject to wireless data communication congestion, the network is no longer subject to the wireless data communication congestion;
  calculating, by the mobile device and in response to the determination that the network is no longer subject to the wireless data communication congestion, a distributed deactivation delay value uniquely related to the mobile device representing an amount of time the mobile device will wait before deactivating the background data communication restriction;
  deactivating, by the mobile device and after waiting the amount of time corresponding to the distributed deactivation delay value, the background data communication restriction with respect to the application programs;
  and permitting, by the mobile device and after deactivation of the background data communication restriction, the application programs to generate data communications over the network for background data communication operations.

11. The method of claim 10, wherein the determining step comprises the step of receiving, from a mobile communication network node and over a wireless link, a notification that the network is no longer subject to the wireless data communication congestion.

12. The method of claim 11, wherein the notification that the network is no longer subject to the wireless data communication congestion is received in a control message.

13. The method of claim 10, wherein the determining step comprises the steps of: monitoring and analyzing interaction of the mobile device with the network; and detecting a condition corresponding to a lack of wireless data congestion.

14. The method of claim 10, wherein the calculating step comprises the steps of: generating an initial distributed deactivation delay value; and performing one or more iterations of a threshold determination until the first of either: a threshold condition is met; or a total number of iterations performed exceeds a maximum number of iterations to be performed, wherein each performed iteration of the threshold determination increases the initial distributed deactivation delay value such that the distributed deactivation delay value is relative to the initial distributed deactivation delay value and the total number of iterations performed.

15. The method of claim 14, wherein: each iteration of the threshold determination comprises the steps of: generating a respective control value; and calculating a respective threshold value; and the threshold condition is met based on a relationship between the respective control value and the respective threshold value produced in each iteration.

16. The method of claim 15, wherein calculating the threshold value comprises calculating $|((i/2x)*30)*(\log(((i/2x)*30)*0.15))|$, wherein i is a number representing a current iteration of the threshold determination and x is the maximum number of iterations to be performed.

17. The method of claim 16, wherein the threshold condition is met if the respective control value produced in the current iteration is less than the respective threshold value produced in the current iteration.

18. The method of claim 14, further comprising the step of generating a seed value unique to the mobile device, wherein the seed value is based on a mobile telephone number of the mobile device, an amount of time in seconds since the mobile device was powered on, and an amount of available free memory in a runtime of the mobile device.

19. The method of claim 18, wherein: the step of generating an initial distributed deactivation delay value comprises generating a random number between 1 and 60 based on the seed value; and the step of generating the respective control value comprises generating a random number between 1 and 100 based on the seed value.

20. An article of manufacture, comprising:
at least one non-transitory machine-readable storage medium; and programming instructions embodied in the at least one medium for execution by a mobile device to be capable of performing functions, the functions comprising functions to:
determine, by a mobile device and while a background data communication restriction of the mobile device prevents application programs on the mobile device from using data communications services of a network for background data communication operations due to a previous determination that the network was subject to wireless data communication congestion, the network is no longer subject to the wireless data communication congestion;
calculate, by the mobile device and in response to the determination that the network is no longer subject to the wireless data communication congestion, a distributed deactivation delay value uniquely related to the mobile device representing an amount of time the mobile device will wait before deactivating the background data communication restriction;
deactivate, by the mobile device and after waiting the amount of time corresponding to the distributed deactivation delay value, the background data communication restriction with respect to the application programs; and
permit, by the mobile device and after deactivation of the background data communication restriction, the application programs to generate data communications over the network for background data communication operations.

21. The article of manufacture of claim 20, wherein the calculating function further comprises functions to:
generate a seed value unique to the mobile device, wherein the seed value is based on a mobile telephone number of the mobile device, an amount of time in seconds since the mobile device was powered on, and an amount of available free memory in a runtime of the mobile device;
generate an initial distributed deactivation delay value by generating a random number between 1 and 60 based on the seed value; and perform one or more iterations of a threshold determination until the first of either: a threshold condition is met; or a total number of iterations performed exceeds a maximum number of iterations to be performed, wherein each performed iteration of the threshold determination increases the initial distributed deactivation delay value such that the distributed deactivation delay value is relative to the initial distributed deactivation delay value and the total number of iterations performed.

22. The article of manufacture of claim 21, wherein: each iteration of the threshold determination includes functions to: generate a respective control value by generating a random number between 1 and 100 based on the seed value; and calculate a respective threshold value based on $|((i/2x)*30)*(\log(((i/2x)*30)*0.15))|$, wherein i is a number representing a current iteration of the threshold determination and x is the maximum number of iterations to be performed; and the threshold condition is met if the respective reference value produced in the current iteration is less than the respective threshold value produced in the current iteration.

* * * * *